2,821,501

RECOVERY OF STARCH

Frederick J. Simpson, Saskatoon, Saskatchewan, Canada, assignor to National Research Council, Ottawa, Canada, a corporation of Canada No Drawing. Application December 8, 1953
Serial No. 397,054

19 Claims. (Cl. 195—7)

This invention relates to the extraction of starch from wheat and to enzymes useful therefor.

The normal method of extracting starch from wheat comprises the initial steps of producing a flour and then removing the gluten. The gluten may be removed by solubilization with dilute alkali, or by washing the dough out of the gluten, or by screening off the gluten and allowing the starch to pass through. A slurry of the starch is left after removal of the gluten and the starch is extracted either by passing the starch slurry over a settling table or by centrifuging the slurry.

With these present known processes of recovering starch from wheat, about 30 to 40 percent of the starch is lost in a slimy sludge known as "squeegee" starch. This material remains wet and slushy throughout the process of starch recovery. It settles very slowly, passes over the starch table into the tailings and is lost. Alternatively, in centrifuging, it collects mainly in the upper part of the centrifuge bowl and eventually may be pushed out by the hard prime starch and lost. Not only does this "squeegee" starch reduce the amount of starch which may be extracted but it also slows down the table settling or centrifuging by causing blockage.

Attempts have been made in the past both to recover the starch present in the "squeegee" starch and to treat the starch slurry to reduce the quantity of starch lost in the "squeegee" starch on subsequent extraction of the starch from the slurry. These prior attempts have achieved no substantial degree of success.

It is the object of the present invention to reduce the loss of starch in the extraction from wheat.

The "squeegee" starch has been found to consist of a hydrophilic pentosan gum in which the starch granules are entrained.

According to the present invention, the starch losses are considerably reduced by degrading the pentosan gum with a pentosanase enzyme.

The enzyme normally used will be one produced during the aerobic growth of an organism, selected from the group consisting of *Bacillus pumilus*, *Bacillus subtilis* (ATCC No. 12711), *Bacillus licheniformis* (ATCC No. 12713), and *Bacillus polymyxa* (ATCC No. 12712), on a propentose-containing substrate, and it is believed that enzymes produced in this manner are new. The term propentose is here taken to mean that material which is the antecedent of pentose, that is, that material which is composed of pentoses or pentosans and can be degraded to pentoses, or that material which can induce or favour the production of pentosanases.

The propentose in the substrate may for example be xylose, arabinose, glucose, sucrose, maltose, and water soluble or partially water soluble materials that contain high proportions of pentoses such as hemicelluloses extracted from plant material, xylans, straw itself, pectins, the sugars found in the spent waters from the separation of starch and gluten, and in sulfite waste liquor. The substrates containing xylose or xylose anhydrides are preferred for the production of enzyme with *Bacillus pumilus* and *Bacillus polymyxa* whereas sucrose may be employed for the production of enzyme by *Bacillus subtilis* and *Bacillus licheniformis*. The preferred concentration of propentose varies from 0.5 to 5 percent by weight of the substrate depending on the availability of the carbon. With the sugars the lower amounts are preferred whereas with the complex materials such as straw the higher amounts are preferred.

As is well known in the art, the substrate will normally contain a source of nitrogen, mineral salts such as phosphates and traces of various metals which are usually found as impurities in the other ingredients of the substrate.

The nitrogen sources that may be used include a wide variety of inorganic and organic substances such as ammonium compounds, urea, and various organic materials, hydrolyzed or unhydrolyzed, derived from animals or plants such as amino acids, peptones, casein, soybean meal, fish meal, bran, malt sprouts, corn-steep-liquor, and distiller's dried solubles. Distiller's dried solubles contains a wide variety of nitrogenous substances, growth factors, and inorganic salts and has been found a particularly valuable addition to the media. The amount of these substances required varies with the availability of their nitrogen, which is desired to be within the range of 0.05 to 0.25 percent nitrogen by weight of the substrate. On a solid basis the useful range is usually from 0.1 to 5 percent.

The mineral salts such as phosphates will be added in concentrations common to most media. Other salts common to media such as those of potassium, magnesium, and calcium, may also be added. Certain elements such as iron, copper, zinc, and manganese may be desirable in trace amounts. When the media contains crude nitrogen sources such as distiller's dried solubles which contains many of these elements, the addition of trace elements may not be necessary.

The pH of the substrate is preferably maintained on the acid side of neutrality. The optimum range is between pH 6 and 7. If the acidity increases and the pH drops below pH 5 or if the alkalinity increases and the pH rises above pH 8 the enzyme will generally be inactivated. The pH may be controlled by the addition of sterile calcium carbonate to neutralize the acids produced by fermentation, by the periodic addition of small amounts of alkali, manually or electronically, and by adjusting the concentration of propentose such that only that amount of acid is produced that can be neutralized by the buffering action of the nitrogenous and inorganic salts contained in the medium.

Control of the tendency of the medium to become alkaline may be done by adding acid as required, by adding fermentable sugars, and by reducing the amount of nitrogenous constituents in the medium.

The preferred temperature for the production of the enzyme is about 30 to 35° C. although temperatures as low as 20° C. or as high as 40° C. may be used. Maximum yield is obtained within 40 to 60 hours depending on the rate of aeration and agitation and the temperature.

The enzyme may be harvested by removing the solids, suspended matter and bacterial cells from the fermented liquor in a supercentrifuge, or the suspended matter may be removed by filtering the fermented liquor. At least the majority of the enzyme is contained in the resultant clarified liquor and this liquor may be used as an enzyme preparation without further treatment. It may be held for a week at 0° C. without loss of activity before use if desired. The culture supernatant or filtrate containing the enzyme may be worked up and purified by the usual processes, concentrated by evaporation in vacuo, or dried in any suitable manner.

It is preferred to prepare the enzyme separately in the manner outlined above and then apply it as required, rather than prepare the enzyme in the starch-containing medium derived from the wheat. This is particularly desirable in the case of enzyme preparations produced from Bacillus subtilis, Bacillus licheniformis and Bacillus polymyxa which may contain amylases and would attack the starch while being produced under the elevated temperature required. These latter enzymes show no substantial attack on the starch during the limited time for the attack of the enzyme on the pentosan gum which may be effected at room temperature. Enzymes produced from Bacillus pumilus may be preferred, however, since there will then be no danger of attack on the starch.

The enzyme treatment to degrade the pentosan gum in the wheat will normally be effected after the wheat has been milled to wheat flour. Due to the proteolytic activity normally shown by the enzymes which are suitable for the present invention, it is preferred to add the enzyme preparation to the starch slurry after the gluten has been removed; this avoids the complications introduced by attack of the enzyme on the gluten.

If desired the "squeegee-starch" may be collected and treated with enzyme separately instead of treating the entire batch of starch milk. Part of the starch may be recovered from the starch milk as is customarily done and the "squeegeestarch" removed and collected. The enzyme preparation in the same proportions and under the optimum conditions of temperature and pH as described may be added and allowed to act upon the pentosan gum. The starch subsequently released may be recovered in the normal manner.

The invention is illustrated in the following examples, the percentages being by weight unless the context otherwise requires:

PREPARING THE ENZYMES

Example I

To 18 litres of water, 360 grams of finely chopped wheat straw, 90 grams of distillers' dried solubles, 72 grams of dibasic ammonium phosphate, 18 grams of potassium chloride, 18 grams of magnesium sulfate heptahydrate, and 36 grams of calcium carbonate were added and mixed. The mixture was poured into a stainless steel fermenter and sterilized in an autoclave (20 minutes at 120° C.). The fermenter was then partially submereged in a water bath whose temperature was regulated at 30° C. A pure culture of Bacillus pumilus, prepared the previous day and incubated for 24 hours in 200 ml. of the above medium, was aseptically added to the cooled medium in the fermenter. Sterile lard oil (50 ml.) to control foaming was also added aseptically at this time. The medium in the fermenter was agitated with a propeller at the rate of 400 R. P. M. and sterile air was blown through the medium at the rate of 9 litres per minute. After 36 hours of incubation, samples were withdrawn aseptically and periodically from the fermentation tank and assayed for activity. Peak activity was obtained after 60 hours' incubation. The fermented liquor was then removed from the fermenter and the pH adjusted to pH 6.5. The liquor was then centrifuged in a Sharples supercentrifuge to remove suspended material and bacterial cells. The supernatant totalling 17 litres contained sufficient enzyme for 0.002 ml. of the supernatant to reduce the viscosity of 4.5 ml. of a 1 percent solution of wheat flour pentosan gum by 50 percent in 30 min. at 30° C. It could be used, without further treatment, to treat the starch milk obtained after removal of gluten from a flour slurry.

Example II

To 18 litres of water were added 180 grams of sucrose, 90 grams of distillers' dried solubles, 82 grams of dibasic ammonium phosphate, 18 grams of potassium chloride, 18 grams of magnesium sulfate heptahydrate, and 36 grams of calcium carbonate. This mixture was sterilized in the fermenter as described in Example I. A pure culture of Bacillus subtilis previously prepared the day before and incubated for 24 hours in 200 ml. of the described medium was used to inoculate, aseptically, the cooled medium. Sterile lard oil (50 ml.) to control foaming was also added aseptically at this time. The culture was permitted to develop at 30° C. with agitation and aeration as described. The peak amount of enzyme was obtained at 48 hr. The fermented liquor was poured from the fermenter and the suspended material removed by centrifugation in a Sharples supercentrifuge. The supernatant totalling 17.2 litres contained sufficient enzyme for 0.004 ml. of the supernatant to reduce the viscosity of 4.5 ml. of a 1 percent solution of pentosan gum obtained from wheat flour by 50 percent in 30 min. at 30° C.

Example III

To 18 litres of spent waters obtained from the separation of starch and gluten were added 75 grams of pentosan gum obtained from wheat fluor, 90 grams of distillers' dried solubles, 63 grams of dibasic ammonium phosphate, 9 grams of magnesium sulfate heptahydrate, 9 grams of potassium chloride and 36 grams of calcium carbonate. After mixing, the liquor was poured into a stainless steel fermenter, sterilized and cooled. A pure culture of Bacillus polymyxa prepared the day previous and incubated for 24 hours in 200 ml. of the above medium was used to inoculate aseptically the cooled medium in the fermenter. Sterile lard oil (50 ml.) to control foaming was also added, aseptically, at this time. The contents were then agitated and aerated as previously described for Bacillus pumilus in Example I. The peak amount of enzyme was obtained at 50 hours. The fermented liquor was then removed, the pH adjusted to pH 6.5 and the suspended matter, bacterial cells and solids removed in a Sharples supercentrifuge. The supernatant liquor (17 litres) obtained contained sufficient enzyme for 0.003 ml. of the supernatant to reduce the viscosity of 4.5 ml. of a 1 percent solution of pentosan gum obtained from wheat flour by 50 percent in 30 min. at 30° C.

Example IV

The preparation of the enzyme solution by this organism followed the same steps and used the same medium as described for Bacillus subtilis in Example II. The supernatant liquor obtained totalling 17.5 litres contained sufficient enzyme for 0.005 ml. of the supernatant to reduce the viscosity of 4.5 ml. of a 1 percent solution of pentosan gum obtained from wheat flour by 50 percent in 30 min. at 30° C.

TREATMENT OF STARCH SLURRY WITH THE ENZYMES

Example V

Seventy-five pounds of flour were made into a soft dough with seven gallons of water at 30° C. then the gluten was broken into curds with the addition of 28 gallons of water and rapid agitation. The gluten and starch milk were separated on a gyrating screen. The gluten curds were washed and again collected on the screen and then dried. A yield of 12.2 pounds of crude dry gluten was obtained. The starch milk or slurry was permitted to flow into a holding tank where it was mixed with 3 gallons of the enzyme preparation obtained from Bacillus pumilus as described in Example I. The mixture was agitated and the enzyme allowed to act for half an hour on the pentosan gums that cause "squeegee-starch." The starch was then removed from the mixture by the use of a basket type centrifuge. The product, white prime starch, when dried weighed 44 pounds, representing a recovery of 89 percent of the starch present in the flour. The starch contained 0.04 percent protein and 0.26 percent pentosan.

Example VI

Seventy-five pounds of flour were made into a soft dough with seven gallons of water at 30° C. then the gluten was broken into curds with the addition of 28 gallons of water and rapid agitation. The gluten and starch milk were separated on a gyrating screen as described. The gluten curds were washed and again collected on the screen and then dried. A yield of 11.9 pounds of crude gluten was obtained. The starch milk was permitted to flow into a holding tank where it was mixed with 3 gallons of the enzyme preparation obtained from *Bacillus subtilis* as described in Example II. The mixture was agitated and the enzyme allowed to act for an hour on the pentosan gums that cause "squeegee-starch." The starch was then removed from the mixture by the use of a basket type centrifuge. The product, white prime starch, when dried weighed 43 pounds, representing a recovery of 87 percent of the starch present in the flour. This starch contained 0.41 percent protein and 0.38 percent pentosan.

Example VII

Seventy-five pounds of flour were made into a soft dough with seven gallons of water at 30° C. then the gluten was broken into curds with the addition of 28 gallons of water and rapid agitation. The gluten and starch milk were separated on a gyrating screen. The gluten curds were washed and again collected on the screen and then dried. A yield of 10.5 pounds of dry crude gluten was obtained. The starch milk was permitted to flow into a holding tank where it was mixed with 3 gallons of the enzyme preparation obtained from *Bacillus polymyxa* as described in Example III. The mixture was agitated and the enzyme was allowed to act for an hour on the pentosan gums that cause "squeegee-starch." The starch was then removed from the mixture by the use of a basket-type centrifuge. The product, white prime starch, when dried weighed 46 pounds, representing a recovery of 93 percent of the starch present in the flour. This starch contained 0.51 percent protein and 0.32 percent pentosan.

Example VIII

Seventy-five pounds of flour were made into a soft dough with seven gallons of water at 30° C. then the gluten was broken into curds with the addition of 28 gallons of water and rapid agitation. The gluten and starch milk were separated on a gyrating screen. The gluten curds were washed and again collected on the screen and then dried. A yield of 10.5 pounds of dry crude gluten was obtained. The starch milk was permitted to flow into a holding tank where it was mixed with 3 gallons of the enzyme preparation obtained from *Bacillus licheniformis* as described in Example IV. The mixture was agitated and the enzyme was allowed to act for an hour on the pentosan gums that cause "squeegee-starch." The starch was then removed from the mixture by the use of a basket-type centrifuge. The product, white prime starch, when dried weighed 43 pounds, representing a recovery of 87 percent of the starch present in the flour. This starch contained 0.85 percent protein and 0.38 percent pentosan.

I claim:

1. In the extraction of starch from wheat containing pentosan gum, the step of degrading said gum but not the starch itself with a pentosanase enzyme.

2. In the extraction of starch from wheat containing pentosan gum, the step of degrading said gum but not the starch itself with a pentosanase enzyme produced during the aerobic growth of an organism, selected from the group consisting of *Bacillus pumilus, Bacillus subtilis, Bacillus licheniformis* and *Bacillus polymyxa*, on a carbohydrate-containing substrate.

3. In the extraction of starch from wheat containing pentosan gum, the step of degrading said gum but not the starch itself with a pentosanase enzyme produced during the aerobic growth of an organism, selected from the group consisting of *Bacillus pumilus* and *Bacillus polymyxa*, on a xylose-containing substrate.

4. In the extraction of starch from wheat containing pentosan gum, the step of degrading said gum but not the starch itself with a pentosanase enzyme produced during the aerobic growth of an organism, selected from the group consisting of *Bacillus subtilis* and *Bacillus licheniformis*, on a sucrose-containing substrate.

5. In the extraction of starch from wheat containing pentosan gum, the step of degrading said gum but not the starch itself with a pentosanase enzyme produced during the aerobic growth of an organism, selected from the group consisting of *Bacillus pumilus, Bacillus subtilis, Bacillus licheniformis* and *Bacillus polymyxa*, on a propentose-containing substrate at a pH between 5 and 8 and at a temperature between 20° C. and 40° C.

6. A process for the extraction of starch from wheat flour comprising substantially separating the gluten from the starch, degrading the pentosan gum by adding to a slurry of the substantially gluten-free starch a separately prepared pentosanase enzyme, and separating the starch from the slurry.

7. A process for the extraction of starch from wheat flour comprising substantially separating the gluten from the starch, degrading the pentosan gum by adding to a slurry of the substantially gluten-free starch a separately prepared pentosanase enzyme produced during the aerobic growth of an organism, selected from the group consisting of *Bacillus pumilus, Bacillus subtilis, Bacillus licheniformis* and *Bacillus polymyxa*, on a propentose-containing substrate, and separating the starch from the slurry.

8. A process for the extraction of starch from wheat flour comprising substantially separating the gluten from the starch, degrading the pentosan gum by adding to a slurry of the substantially gluten-free starch a separately prepared pentosanase enzyme produced during the aerobic growth of an organism, selected from the group consisting of *Bacillus pumilus* and *Bacillus polymyxa*, on a xylose-containing substrate, and separating the starch from the slurry.

9. A process for the extraction of starch from wheat flour comprising substantially separating the gluten from the starch, degrading the pentosan gum by adding to a slurry of the substantially gluten-free starch a separately prepared pentosanase enzyme produced during the aerobic growth of an organism, selected from the group consisting of *Bacillus subtilis* and *Bacillus licheniformis*, on a sucrose-containing substrate, and separating the starch from the slurry.

10. A process for the extraction of starch from wheat flour comprising substantially separating the gluten from the starch, degrading the pentosan gum by adding to a slurry of the substantially gluten-free starch a separately prepared enzyme produced during the aerobic growth of an organism, selected from the group consisting of *Bacillus pumilus, Bacillus subtilis, Bacillus licheniformis* and *Bacillus polymyxa*, on a propentose-containing substrate at a pH between 5 and 8 and at a temperature between 20° C. and 40° C., and separating the starch from the slurry.

11. A method of preparing a pentosanase enzyme comprising aerobically growing an organism, selected from the group consisting of *Bacillus pumilus, Bacillus subtilis, Bacillus licheniformis* and *Bacillus polymyxa*, on a propentose-containing substrate.

12. A method of preparing a pentosanase enzyme comprising aerobically growing an organism, selected from the group consisting of *Bacillus pumilus* and *Bacillus polymyxa*, on a xylose-containing substrate.

13. A method as claimed in claim 11 in which the substrate contains 0.5–5 percent by weight of propentose.

14. A method as claimed in claim 11 in which the growth is effected at pH 5–7.

15. A method as claimed in claim 11 in which the growth is effected at pH 6–7.

16. A method as claimed claim 11 in which the growth is effected at 20–40° C.

17. A method as claimed in claim 11 in which the growth is effected at 30–35° C.

18. A method of preparing a pentosanase enzyme comprising growing an organism, selected from the group consisting of *Bacillus pumilus, Bacillus subtilis, Bacillus licheniformis* and *Bacillus polymyxa*, on an aqueous substrate containing 0.5–5 percent by weight of propentose at a pH 5–7 and temperature 20–40° C., and removing solid material to isolate an aqueous preparation of the enzyme.

19. A method as claimed in claim 18 in which the growth is effected for 36–60 hours.

References Cited in the file of this patent

UNITED STATES PATENTS

| 490,538 | Brown | Jan. 24, 1893 |
| 2,302,079 | Waldmann | Nov. 17, 1942 |

FOREIGN PATENTS

| 8,447 | Great Britain | of 1909 |

OTHER REFERENCES

Oppenheimer: Die Fermente und ihre Wirkungen, 5th Aufgabe, 1925, page 759.

Tilden: Jour. Bact. 43 (1942), pages 527–544.

Tauber: Chemistry and Technology of Enzymes, Wiley, 1949, page 401.

Sumner et al.: The Enzymes, vol. 1, 1951, page 741.